US008856681B2

(12) United States Patent
Rodden et al.

(10) Patent No.: US 8,856,681 B2
(45) Date of Patent: Oct. 7, 2014

(54) METHOD AND SYSTEM FOR AUTOMATICALLY RESIZING AND REPOSITIONING WINDOWS IN RESPONSE TO CHANGES IN DISPLAY

(75) Inventors: James F. Rodden, Campbell, CA (US); Guyerik B. Fullerton, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 786 days.

(21) Appl. No.: 11/641,664

(22) Filed: Dec. 20, 2006

(65) Prior Publication Data

US 2007/0101300 A1 May 3, 2007

Related U.S. Application Data

(63) Continuation of application No. 10/219,261, filed on Aug. 16, 2002, now Pat. No. 7,155,682, which is a continuation of application No. 09/309,286, filed on May 11, 1999, now Pat. No. 6,473,102.

(60) Provisional application No. 60/084,966, filed on May 11, 1998.

(51) Int. Cl.
| | |
|---|---|
| *G06F 3/00* | (2006.01) |
| *G06F 3/048* | (2013.01) |
| *G06F 3/0481* | (2013.01) |
| *G09G 5/14* | (2006.01) |

(52) U.S. Cl.
CPC ............... *G06F 3/0481* (2013.01); *G09G 5/14* (2013.01)
USPC ........... 715/800; 715/810; 715/764; 715/788; 715/781; 715/760

(58) Field of Classification Search
USPC .................. 715/764, 780, 788, 781, 800, 760
See application file for complete search history.

(56) References Cited

U.S. PATENT DOCUMENTS

| | | | |
|---|---|---|---|
| 4,789,962 A | 12/1988 | Berry et al. | |
| 5,060,170 A | * 10/1991 | Bourgeois et al. | ............ 715/788 |
| 5,227,771 A | 7/1993 | Kerr et al. | |
| 5,434,964 A | * 7/1995 | Moss et al. | ..................... 715/788 |

(Continued)

OTHER PUBLICATIONS

U.S. Appl. No. 10/219,261, Advisory Action mailed Jul. 12, 2006, 3 pgs.

(Continued)

*Primary Examiner* — Amy Ng
*Assistant Examiner* — Erik Stitt
(74) *Attorney, Agent, or Firm* — Schwegman Lundberg & Woessner, P.A.

(57) ABSTRACT

Windows in a graphical user interface are automatically repositioned and resized in response to changes in a display configuration. If a window is not capable of being fully displayed within the reconfigured display area, it is constrained to fit the available space. In determining the constraints for the window, the window is given a size which permits an integral amount of information to be displayed to the user. If a minimum required size is not already present in the available display area, the window is moved into the available area until the minimum size is attained. If the visible portion of the window already contains the minimum required area, a determination is made whether additional integral components of the window can be displayed. The window is then appropriately shrunk or expanded to permit an integral number of components to be displayed, and control elements are added to the window.

14 Claims, 6 Drawing Sheets

(56) References Cited

U.S. PATENT DOCUMENTS

| | | | | |
|---|---|---|---|---|
| 5,459,825 A * | 10/1995 | Anderson et al. | | 715/815 |
| 5,513,342 A | 4/1996 | Leong et al. | | |
| 5,570,462 A * | 10/1996 | McFarland | | 345/648 |
| 5,572,647 A * | 11/1996 | Blades | | 715/798 |
| 5,668,997 A | 9/1997 | Lynch-Freshner et al. | | |
| 5,675,755 A * | 10/1997 | Trueblood | | 715/791 |
| 5,682,529 A * | 10/1997 | Hendry et al. | | 713/100 |
| 5,699,353 A * | 12/1997 | Kent | | 370/315 |
| 5,699,535 A * | 12/1997 | Amro | | 715/800 |
| 5,751,283 A * | 5/1998 | Smith | | 715/798 |
| 5,760,772 A | 6/1998 | Austin | | |
| 5,767,850 A | 6/1998 | Ramanathan et al. | | |
| 5,841,420 A * | 11/1998 | Kaply et al. | | 345/421 |
| 5,847,706 A | 12/1998 | Kingsley | | |
| 5,859,639 A | 1/1999 | Ebrahim | | |
| 5,872,974 A * | 2/1999 | Mezick | | 717/109 |
| 5,886,694 A * | 3/1999 | Breinberg et al. | | 715/788 |
| 5,923,307 A * | 7/1999 | Hogle, IV | | 345/4 |
| 6,008,809 A | 12/1999 | Brooks | | |
| 6,011,551 A | 1/2000 | Amro | | |
| 6,014,138 A * | 1/2000 | Cain et al. | | 715/826 |
| 6,215,502 B1 * | 4/2001 | Ferguson | | 345/648 |
| 6,252,593 B1 * | 6/2001 | Gti | | 715/781 |
| 6,335,743 B1 * | 1/2002 | Owings | | 715/801 |
| 6,473,102 B1 * | 10/2002 | Rodden et al. | | 715/788 |
| 6,573,913 B1 * | 6/2003 | Butler et al. | | 715/761 |
| 7,155,682 B2 * | 12/2006 | Rodden et al. | | 715/788 |
| 7,190,379 B2 * | 3/2007 | Nissen | | 345/660 |
| 7,216,302 B2 * | 5/2007 | Rodden et al. | | 715/815 |
| 7,554,510 B1 * | 6/2009 | Grigor et al. | | 345/3.1 |
| 7,636,899 B2 * | 12/2009 | Purcell et al. | | 715/790 |

OTHER PUBLICATIONS

U.S. Appl. No. 10/219,261, Final Office Action mailed Mar. 29, 2006, 8 pgs.

U.S. Appl. No. 10/219,261, Non Final Office Action mailed Oct. 19, 2005, 9 pgs.

U.S. Appl. No. 10/219,261, Notice of Allowance mailed Aug. 16, 2006, 6 pgs.

U.S. Appl. No. 10/219,261, Preliminary Amendment filed Aug. 16, 2002, 6 pgs.

U.S. Appl. No. 10/219,261, Response filed Jan. 19, 2006 to Non Final Office Action mailed Oct. 19, 2005, 10 pgs.

U.S. Appl. No. 10/219,261, Response filed, Jun. 28, 2006 to Final Office Action mailed Mar. 29, 2006, 15 pgs.

U.S. Appl. No. 10/219,261, Response filed Jul. 28, 2006 to Advisory Action mailed Jul. 12, 2006, 7 pgs.

* cited by examiner

METHOD AND SYSTEM FOR AUTOMATICALLY RESIZING AND REPOSITIONING WINDOWS IN RESPONSE TO CHANGES IN DISPLAY

CROSS-REFERENCE TO RELATED APPLICATIONS

This application is a continuation application of application Ser. No. 10/219,261, filed Aug. 16, 2002 now U.S. Pat. No. 7,155,682, which in turn is a continuation of application Ser. No. 09/309,286, filed May 11, 1999, now U.S. Pat. No. 6,473,102, issued Oct. 29, 2002, and claims the benefit of Provisional Application No. 60/084,966, filed May 11, 1998.

FIELD OF THE INVENTION

The present invention is generally directed to graphical user interfaces for computers, and more particularly to the automatic repositioning and/or resizing of utility windows in response to actions that may affect the view or content of such windows on a display.

BACKGROUND OF THE INVENTION

As graphical user interfaces and display systems for computers continue to offer increased functionality, they provide the user with greater flexibility in manipulating the information that is displayed on a monitor, or similar type of display device. In some instances, however, such manipulation could produce unexpected results. For example, some display systems offer the user the ability to change the resolution of the display device. If the user decreases the resolution of the device, for example to make icons or text appear larger, the objects on the display will move relative to a reference point, as well as change size, in accordance with the change in resolution. The user may prefer that certain objects remain in their original position, however. For instance, it may be desirable to keep tool palettes in a corner of the display. Furthermore, some of the objects at the periphery of the original display may be partially removed from view, even though the user may desire to have such objects remain readily accessible. Such objects might include utility windows that the user may want to frequently access during the operation of the computer.

Similar situations can occur when objects are moved on the desktop of the user interface, or when display configurations change. For instance, if the user switches the display from a full-sized monitor to an LCD screen on a notebook computer, the different operating parameters of the two display devices may affect the size of the desktop. As a result, the positions and sizes of the objects on the display can change, and some of them may become unviewable because they are positioned outside of the display area. It is desirable, therefore, to provide a mechanism which is capable of maintaining windows and other similar objects in an accessible condition that conforms to the user's preferences, despite changes in the display environment.

SUMMARY OF THE INVENTION

In accordance with the present invention, this objective is achieved by a method and system which automatically repositions and resizes windows in response to movement of the window or changes in a display configuration. If the position of a given window changes relative to available display space, a determination is first made of the preferred size and position of the window. If the window is not capable of being fully displayed within the available display area, it is constrained to fit the current display area. In determining the constraints for the window, a first step provides a window size which permits a minimum required amount of information to be displayed to the user. For example, if the window is a utility window containing buttons that permit user access to various processes or application programs, the minimum size for the window requires that at least one button be visible. If the minimum size is not already present in the available display area, the window is moved into the available area until the minimum size is attained. Conversely, if the visible portion of the window already contains the minimum required area, a determination is made whether additional integral components of the window can be displayed. The window is then appropriately shrunk or expanded to permit an integral number of components, e.g. buttons, to be displayed. Thereafter, control elements are added to the window, such as scroll buttons, and the window is redrawn at the new size and position.

As a further feature of the invention, the position of the window is varied so that it conforms to the position it occupied prior to the change in configuration. With this approach, if the user expects to have the window at a particular position, it will remain at that position regardless of changes in the size or resolution of the display device.

Further features of the invention, as well as the advantages offered thereby, are described in greater detail hereinafter with reference to particular examples illustrated in the accompanying drawings.

DETAILED DESCRIPTION

To facilitate an understanding of the present invention, it is described hereinafter with reference to a particular example of a graphical user interface having a utility window that permits a user to access any one of multiple processes that are simultaneously executing on a computer. It will be appreciated, however, that this particular example is not the only practical embodiment of the invention. Rather, the invention is applicable to any type of graphical object that may appear on a desktop or other visible portion of a graphical user interface, and which the user desires to be able to readily access at a preferred position in any configuration of the display system.

The present invention is particularly directed to features of a graphical user interface for a computer. While the specific hardware components of a computer system do not form part of the invention itself, they are briefly described herein to provide an overview of the environment in which the principles of the invention are implemented.

Figure 1:
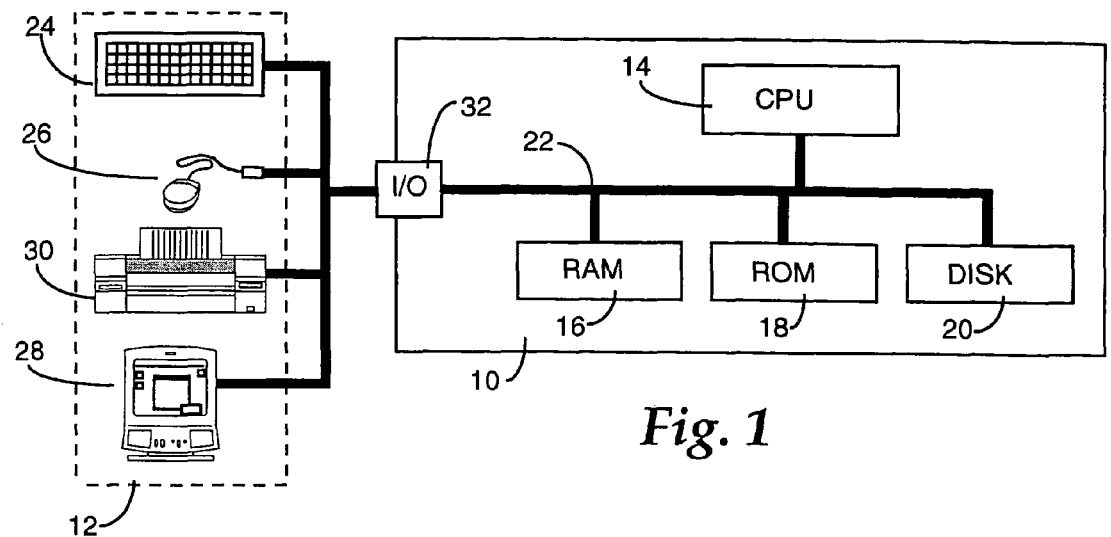
FIG. 1 is a block diagram of the basic components of a computer system in which the invention can be implemented.

Referring to FIG. 1, an exemplary computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as magnetic or optical disk 20, or other suitable computer-readable media. The CPU 14 communicates with each of these forms of memory through an internal bus 22. Typically, the operating system for the computer, including the graphical user interface, is permanently stored on the media 20, and loaded into the random access memory 16, for execution during the operation of the computer.

The peripheral devices 12 can include a data entry device such as a keyboard 24, and a pointing or cursor control device 26 such as a mouse, trackball, pen or the like. A display device 28, such as a CRT monitor, an LCD screen or a plasma display, provides the visual portion of the graphical user interface, to facilitate the user's interaction with the operation of the computer. Other peripheral devices, such as a printer 30, can also be connected to the computer and controlled through the graphical user interface. Each of these external peripheral devices communicates with the CPU 14 by means of one or more input/output ports 32 on the computer.

Figure 2:
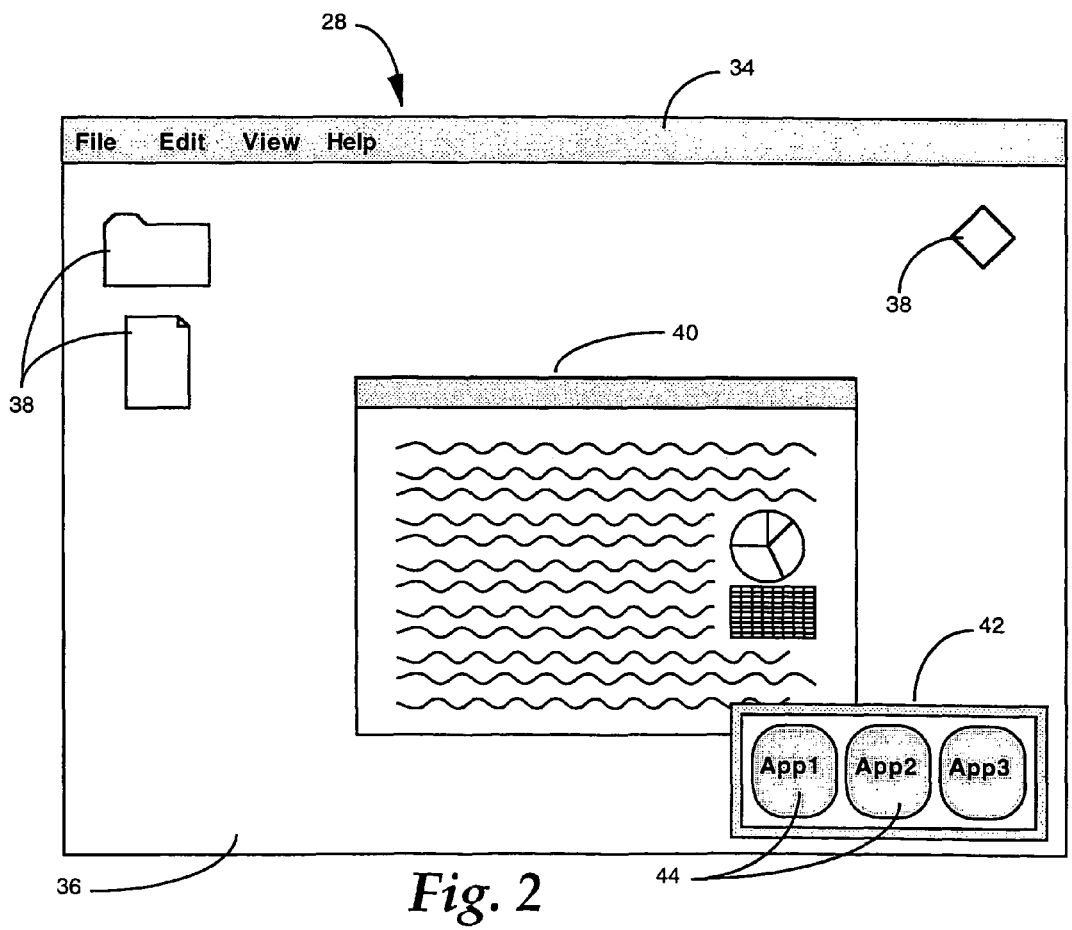
FIG. 2 is an illustration of an exemplary user interface.

An example of a graphical user interface which might appear on the display 28 of the computer system is illustrated in FIG. 2. In this particular example, the user interface includes a menu bar 34 which provides the user with access to commands for controlling the operation of the computer and/or application programs running thereon. The user interface also includes a desktop area 36 which contain various icons 38, and a window 40 associated with a particular application program running on the computer, e.g. a word processing or graphics program. Also appearing on the desktop is a utility window 42 containing a number of buttons 44 that are respectively associated with different application programs, or processes, that are currently executing on the computer. By clicking upon any of these buttons, the user can switch between the different programs that are running on the computer. Depending upon which program is selected, the window 40 might be replaced by a different window associated with the selected program. If multiple windows are being displayed, the window associated with the selected program is displayed in front of the windows that pertain to the other, non-selected programs. In the example of FIG. 2, the utility window 42 is a "floating" window, which means that it always appears in the foreground of the user interface, i.e., on top of any other windows on the desktop, so that the user always has access to the various process selection buttons.

Depending upon the capabilities of the computer system, the user may have the option to change the configuration of the display system. For instance, the user may be able to add or delete display devices, switch from one display device to another, or vary the resolution of the current display device. By varying the resolution, the user is effectively provided with the ability to zoom in or zoom out, and thereby change the amount of information that is displayed. For instance, the example illustrated in FIG. 2 might be displayed on a monitor with a resolution that is 1,024 pixels wide by 768 pixels high.

Figure 3:
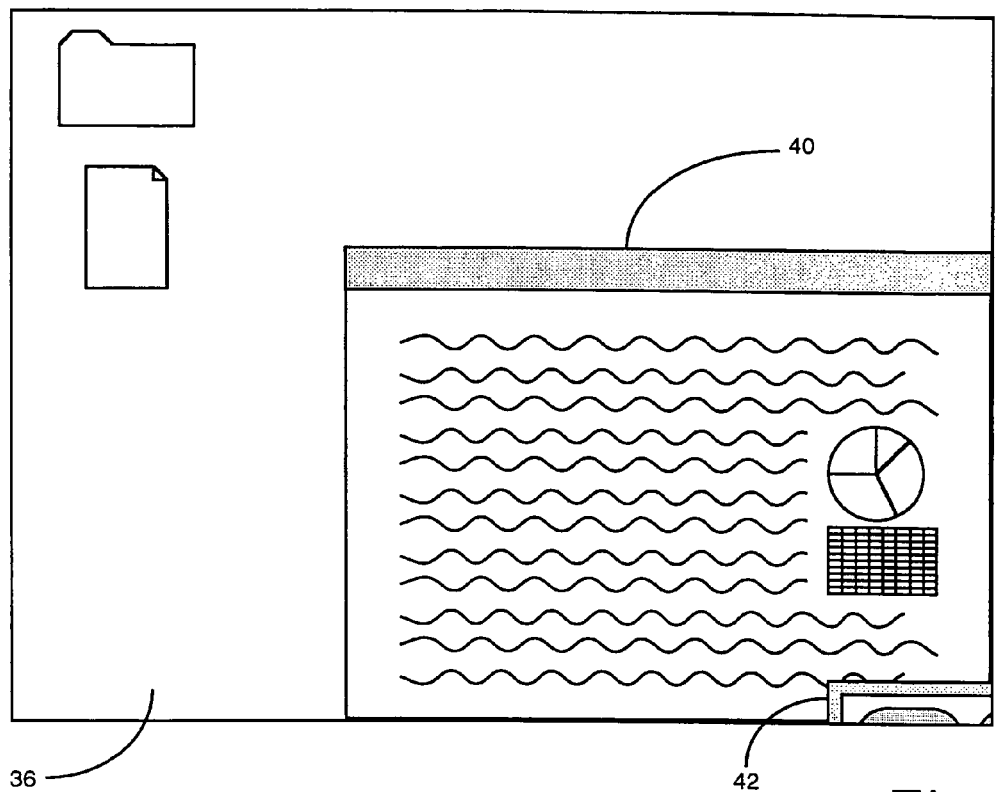
FIG. 3 is another illustration of the user interface, displayed at a lower resolution.

To enlarge the text appearing in the window 40, the user might change the resolution to 800 by 600 pixels, providing the result illustrated in FIG. 3. As can be seen, the size of the window 40, and hence the text and objects appearing therein, has been increased. As a result of this change, however, the utility window 42 has been repositioned to the lower right corner of the desktop, and a significant portion of the window lies outside of the available display area of the monitor. Consequently, the buttons 44 of the window may no longer be accessible by the user.

A similar result can occur in other situations as well. For instance, the user may move the location of the window 42, either intentionally or accidentally, to a location where the buttons are no longer accessible. In another scenario, a smaller monitor might be substituted for the original monitor, or the user might switch to a different computer having a smaller monitor. In each of these various scenarios, the user may desire to have access to the buttons of the utility window 42 at all times. In accordance with one aspect of the present invention, such a result can be attained by automatically repositioning and/or resizing the window whenever an event occurs which could have an effect upon the content of the displayed window.

Figure 5:
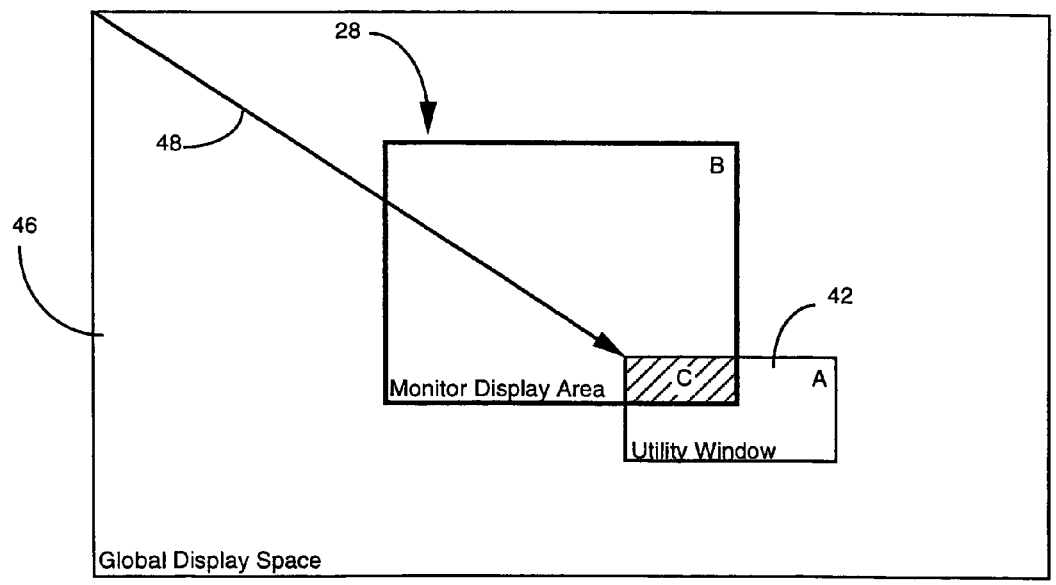
FIG. 5 is an illustration of a global display space and the calculation of bounding rectangles.
Figure 4:
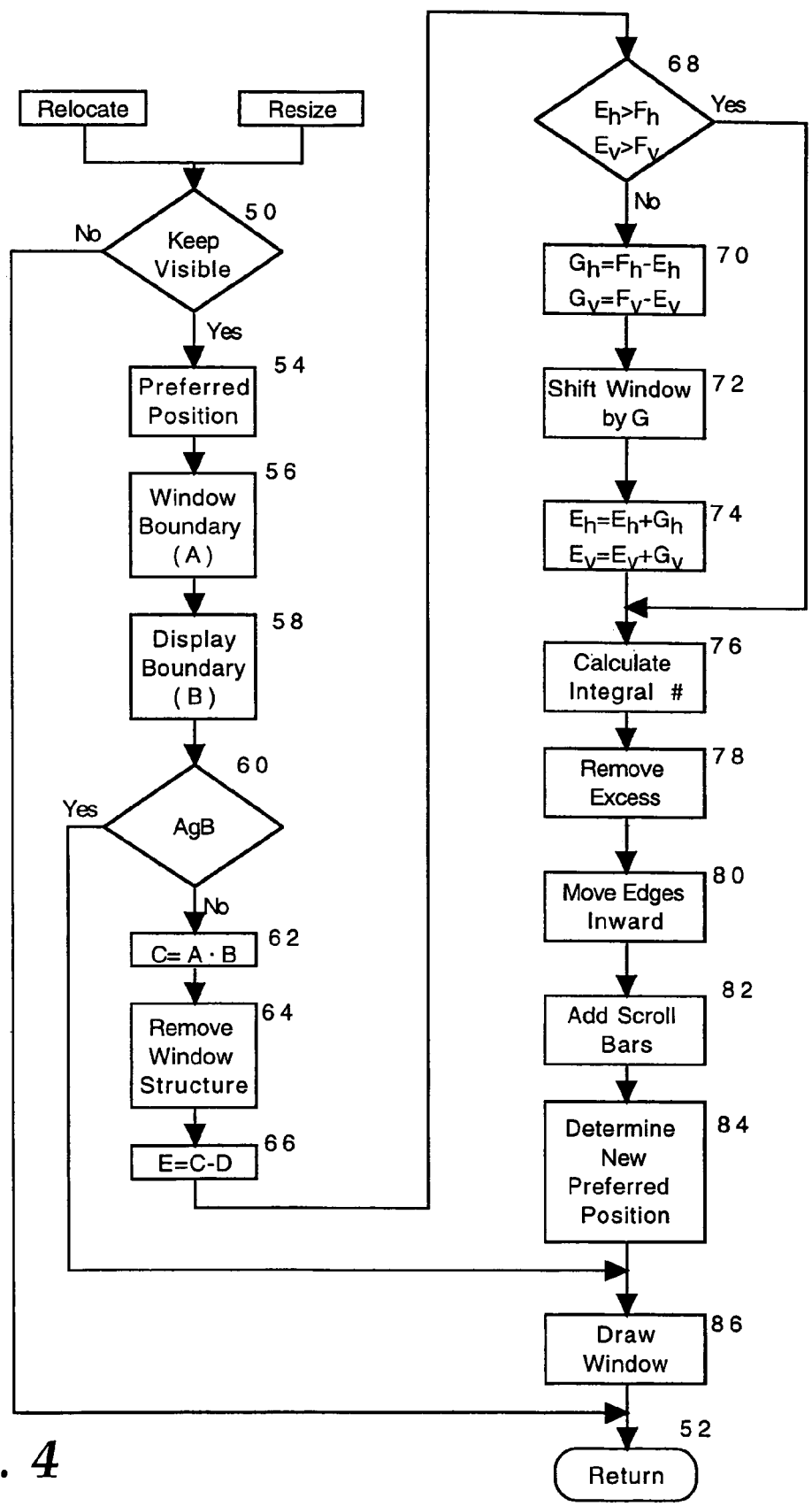
FIG. 4 is a flow chart of the window resizing and repositioning process.
Figure 6:
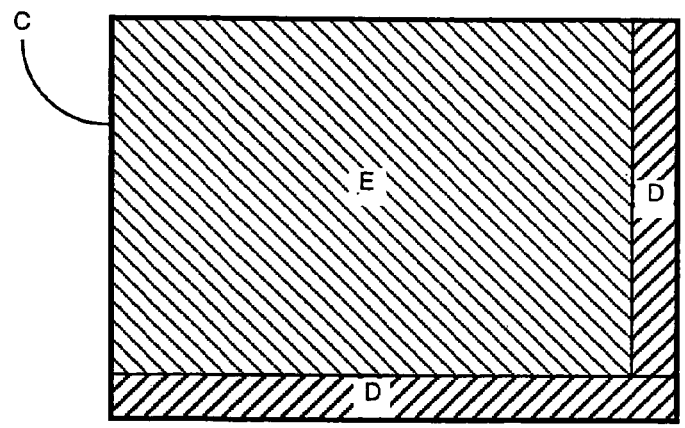
FIG. 6 is an illustration of the calculation of the window content area.
Figure 7:
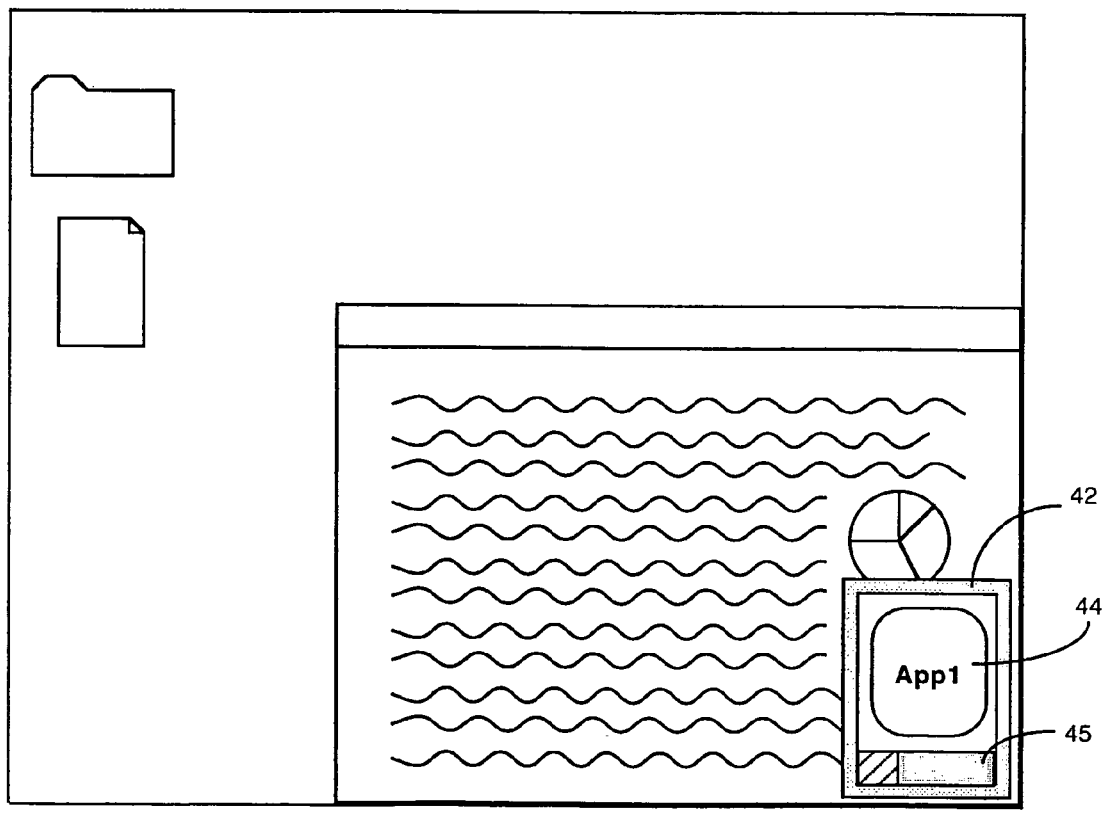
FIG. 7 is an illustration of the user interface of FIG. 3, with the window redrawn at its new size and position.

A flowchart which illustrates this aspect of the present invention is shown in FIG. 4, and explained with reference to the examples depicted in FIGS. 5-7. Whenever a window of interest is moved, or the configuration of the display changes, the subroutine depicted in FIG. 4 is called. A notification that one of these events has occurred can be provided by an appropriate portion of the operating system that is associated with these elements. For example, if the configuration of the display changes, e.g. as a result of a change in resolution, a display manager can provide a notification to this effect, which causes the operating system to call the procedure depicted in FIG. 4. Similarly, a window manager or the like can provide a notification when a window is moved on the desktop.

The process of the present invention may not be called for every window or other object which appears on the desktop. Rather, it is more likely that it will be selectively applied to certain types of objects, such as utility windows and tool palettes that provide the user with access to certain resources or processes, and which the user desires to have available at all times. To this end, the user might be provided with a preference feature for each window, to allow certain types of windows to be identified as those which the user desired to keep visible on the desktop, similar to the manner in which a floating window is designated.

In response to a notification that an event has occurred which could affect the content of a window, a determination is first made at step 50 whether any window is currently being displayed which has been designated as one which the user desires to keep on the desktop. If there are none, no further action is taken, and the process returns at step 52. If, however, a window having such a designation is present, the system first calculates a preferred position for the window within the area of a global display space, at step 54. Referring to FIG. 5, the display system for a computer operates within an area that can be identified as a global display space 46. The positions of windows and other objects within the global space are typically defined in terms of the position of an origin point, e.g. the upper left corner of the object, relative to the origin of the display space. Typically, the screen of a display device 28 encompasses only a portion of the global space. Thus, when a user moves a window or other object off the screen, that object remains in the memory of the computer, but is not visible on the display device. In the example of FIG. 5, the window 42 of interest is located within the global display space 46 such that only the upper left corner of the window is visible on the screen of the display device 28.

In the calculation of the preferred position for the window which occurs at step 54, the location of the origin for the window is determined. In FIG. 5, this location is identified in terms of a vector 48. As part of this process, the preferred size for the window is also calculated. The preferred size is the size necessary to illustrate all of the content of the window without the need for scroll bars. For instance, as illustrated in FIG. 2, the window 42 contains three buttons 44, which respectively correspond to three different processes, e.g. application programs, that are simultaneously executing on the computer. If a fourth process is launched, a fourth button is added to the window. To accommodate the extra button, the window is allowed to grow. In the case of a horizontally oriented window, as depicted in FIG. 2, the growth direction might be to the right. A vertically oriented window, on the other hand, might grow in a downward direction. It can be seen that, as additional processes are launched, the window can grow to an appreciable size. Therefore, the user may desire to limit the window to a particular size, e.g. a maximum of three buttons. In such a case, as the number of simultaneously executing processes grows beyond three, scroll bars are displayed in the window, to permit the user to selectively access different groups of buttons within the visible portion of the window.

The calculation of the preferred position for the window assumes that scroll bars are not needed. Therefore, if five processes are currently executing on the computer, the size of a window that contains five buttons is calculated. Once the preferred size of the window is calculated, a determination is made whether the entire window is contained within the area of the display 28. To do so, the boundary of the window is calculated at step 56. The boundary is typically calculated as a rectangle, which is designated as A in FIG. 5. The boundary of the display device 28 is also calculated at step 58, and designated as a rectangle B. At this point, a determination is made at step 60 whether the rectangle A is totally contained within the rectangle B. If so, there is no need to resize the window, and the window is drawn at its current size and position. In the example illustrated in FIGS. 4 and 5, however, the preferred window A is not contained within the display boundary B. Therefore, it may be necessary to resize and/or reposition the window. To do so, the area of intersection between the two rectangles, the shaded rectangle C, is calculated at step 62. The result is a new global boundary for the window. At step 64, the area of the global boundary is reduced by a few pixels along each edge, to take into account the width of the window structure, i.e. a frame, which typically appears around the border of each window.

Since the global window area C is less than the preferred window size A, scroll buttons will be required to provide the user with access to all of the contents of the window. Therefore, at step 66, the area that will be required by the horizontal and vertical scroll bars, D, is removed from the area of the global window boundary C. The resulting area, E, determines the amount of space that is available for the content of the window, as depicted in FIG. 6.

Once the area available for content, E, has been calculated, a determination is made whether this area is sufficient to accommodate at least one integral unit of content. In the example given herein, the integral unit of content is a button 44 for a process. In other cases, the integral unit of content might be specified as a certain area or minimum number of words or other objects. At step 68, the horizontal and vertical dimensions of the area E are individually compared against the corresponding dimensions of the integral unit of content, denoted as F. In the illustrated example, these dimensions correspond to the height and width of a button 44. If either of the dimensions of the available area E is less than the corresponding dimension of a button, an offset value G is calculated at step 70, and the interior corner of the window, i.e. the corner contained within the display area, is shifted into the display area by the amount of the offset, at step 72. In the example of FIGS. 3 and 5, therefore, the interior corner of the window is the upper left corner, so the window is shifted both to the left and upwardly by the corresponding horizontal and vertical offset values, so that the available area accommodates at least one button. In addition, at step 74 the available content area E of the window is increased by the amount of the offset.

Once the window is of a size and position so that a minimum amount of content can be displayed, a determination is then made, at step 76, of the number of integral units of content that will fit in the available space E. In the example described above, of course, only one integral unit, i.e. one button, can be accommodated, since the window was only moved by an amount sufficient to bring this about. In other cases, however, the original content area E may have been sufficient to accommodate at least one, and possibly more buttons, i.e. an affirmative result was obtained at step 68. The determination of step 76 is accomplished by dividing each of the height and width dimensions of the area E by the corresponding dimensions of one button, to determine an integral number of buttons that will fit in each dimension. At step 78, any excess portion of the area E, beyond that which is necessary to accommodate the integral number of buttons, is removed, and the outermost edges of the window are then moved inwardly by the amount of excess that was removed, at step 80. Thereafter, the area required for the scroll bars is added back to the content area E, at step 82. As a result of this procedure, the window has been resized and repositioned to accommodate an integral number of process buttons, or other units of content. The preferred position for the window is then redetermined at step 84, so that it is aligned with the position of the window determined at step 72. Finally, at step 86, the window is redrawn at the preferred position, as illustrated in FIG. 7. As can be seen, the window contains one process button 44, as well as a horizontal scroll bar 45 for accessing the other buttons which are not displayed.

Figure 8A:
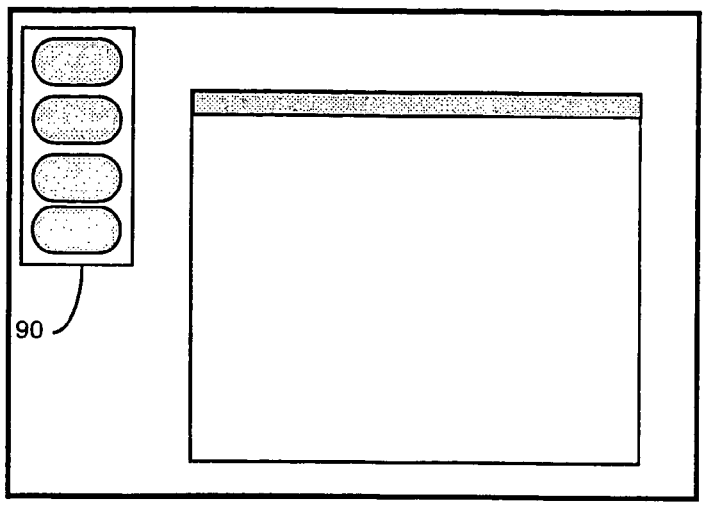
FIGS. 8a-8c illustrate other examples of a desktop for a user interface.
Figure 8B:
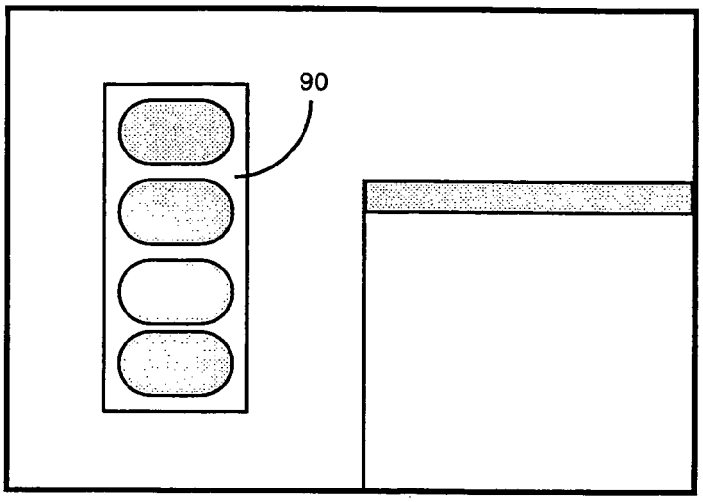

In the procedure depicted in FIG. 4, if the global boundary of the window is contained within the bounding rectangle of the display, no further action is taken at step 60, and the window is drawn at its current position. In accordance with another aspect of the invention, however, it may be desirable to reposition the window when there is a change in the resolution or size of the monitor, even if the window is already fully displayed on the screen. FIG. 8a illustrates an example in which a utility window 90 is located in the upper left corner of the desktop. If the user decreases the resolution of the display, all of the objects on the display will move in a direction away from the origin point. In this example, therefore, the objects move to the left and down. The result of such a change in resolution is illustrated in FIG. 8b. As can be seen, the utility window 90 is now located more toward the center of the screen. It may be the case, however, that the user desires the window to remain in the upper left corner of the screen.

Figure 9:
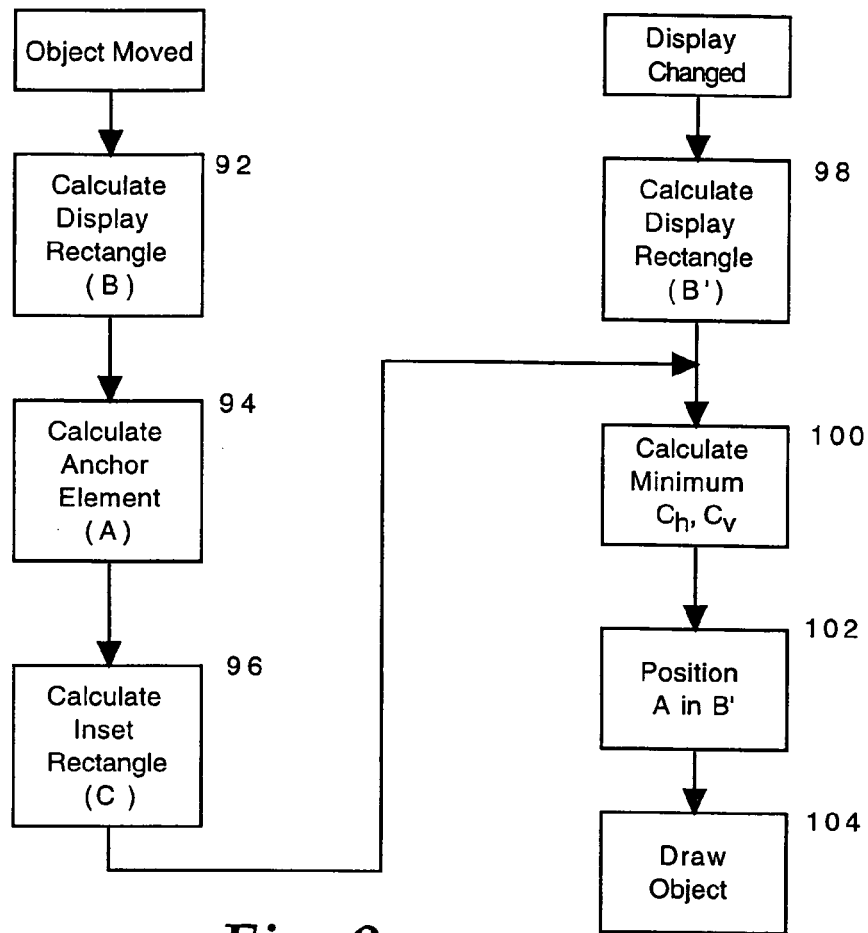
FIG. 9 is a flow chart of the procedure for maintaining a window at a desired position.

FIG. 9 illustrates a process for maintaining the window at the position designated by the user, when the size and/or resolution of the display changes. This process is explained with reference to an example illustrated in FIG. 10.

Figure 8C:
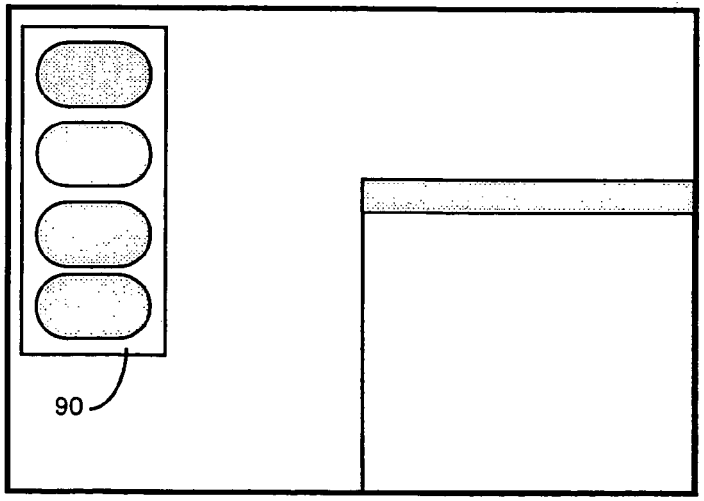

Referring to FIG. 9, when a user places an object on the display, or moves an object which is already being displayed, such as a window, the bounding rectangle B of the display is calculated at step 92. An anchor element A, which represents a feature of the object of interest, is calculated at step 94. The anchor element may be a 2-dimensional object, or it may be comprised of a different number of dimensions. For a window which remains at a fixed size, a 2-dimensional rectangle may be most appropriate. However, if the window is capable of changing size automatically, such as a utility window with a variable number of buttons, it may be preferable to choose one edge of the window as the basis for the anchor element, rather than its entire border. In the example of FIG. 8, the window 90 might be a vertically oriented utility window that grows downwardly as more buttons are added. In this case, it is preferable to choose the top edge of the window as the basis for the anchor element. At step 94, therefore, the anchor element A is computed as the horizontal line which forms the top edge of the window. If the window is capable of growing in two dimensions, a single point might form the basis for the anchor.

At step 96, the distance from each edge of the element A to a corresponding edge of the bounding rectangle B is calculated. These values can be calculated as absolute values, or as percentages of the height and width dimensions of the bounding rectangle B. The result of these calculations is labelled as an inset rectangle C.

Figure 10:
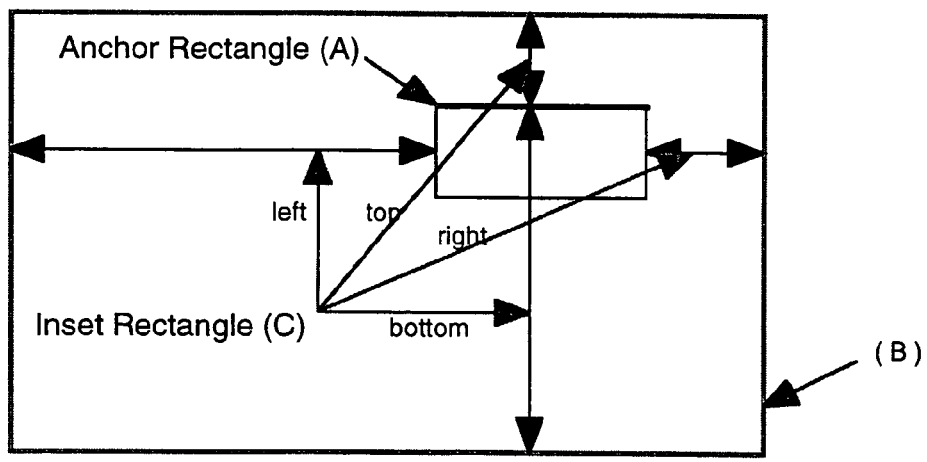
FIG. 10 is an illustration of the calculation of the boarding rectangles for the procedure of FIG. 9.

Thereafter, if the size or resolution of the display is changed, a new bounding rectangle B' is determined at step 98. The smaller dimension of the inset rectangle C is determined along each axis, at step 100. In other words, the minimum dimension for the top and bottom values, and the minimum dimension for the left and right values, are selected. These selected values are then used to position the anchor element A, and hence the object of interest, relative to the corresponding edges of the new bounding rectangle B'. In the example of FIG. 10, the top and right dimensions of the inset rectangle C are the smaller of each pair. Therefore, at step 102, the anchor element A for the object is positioned from the top and right edges of the bounding rectangle B by the amounts determined by the top and right dimensions for the inset rectangle C. The window 92 is then drawn at step 104, in accordance with the position of the anchor element A. The result of this approach can be seen in the example of FIG. 8c. As illustrated therein, the window has remained in the upper left corner of the desktop, even though all other objects on the desktop have shifted to the right and down. With this approach, therefore, a utility window or tool palette remains at the position at which the user expects it to be. Again, this functionality can be selectively applied to individual objects, for instance by means of preference items, so that only those objects will be anchored to their original positions when the display is changed.

While the foregoing procedure has been described in the context of positioning a two-dimensional object, it can be readily applied to a variety of different situations. For example, it can be used with any number of dimensions, for lines, rectangles, cubes, etc. Furthermore, it can be applied to objects of any shape, not just those having a rectilinear shape.

From the foregoing, it can be seen that the present invention provides a mechanism that permits a user to maintain a desired configuration of objects in a user interface, regardless of changes in the size and/or resolution of a display device. For those situations in which a portion of an object of interest may became obscured from view as a result of change in the display device or the like, the procedure of the present invention ensures that at least a minimum amount of the object remains on the desktop, to provide the user with access to the full functionality represented by the object. Furthermore, even if the object remains completely within view upon a change of display parameters, the present invention functions to maintain the object at a position designated by the user.

It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for maintaining information at an accessible position in a graphical user interface on a display device, comprising:
   determining whether an event has occurred that could affect the accessibility of the information;
   identifying, based on preference information designating objects a user desires to keep visible on the display device, a designated object currently being displayed as an object which a user desires to keep on-screen on the display device;
   determining whether the designated object has an on-screen portion within the area of the display device that is of a size sufficient to contain at least one unit of the information, wherein the designated object is a window, and wherein the at least one unit of the information comprises at least one window control;
   in response to determining that the designated object does not have an on-screen portion within the area of the display device that is of a size sufficient to contain at least one unit of the information, moving the designated object to bring a portion of the designated object located outside the area of the display device onto the on-screen area of the display device, by an amount such that the on-screen portion of the designated object has a size sufficient to contain one unit of the information and the on-screen portion is less than all of the designated object; and
   displaying the designated object containing the at least one unit of the information on the display device.

2. The method of claim 1, wherein the determining whether an event has occurred comprises:
   determining whether an event has occurred that causes at least a portion of the information to move outside a visible portion of the display device.

3. A system comprising:
   a display device configured to display a graphical user interface within a boundary of the display device; and
   a processor coupled to a memory device, the memory device including instructions to be executed by the processor to generate the graphical user interface for display on the display device, the instructions also causing the process for perform operations including:
   determining whether an event has occurred that could affect the accessibility of the information;
   identifying, based on preference information designating objects a user desires to keep within the boundary of the display device, a designated object currently being displayed as an object which a user desires to keep within the boundary of the display device;
   determining whether the designated object has a portion within the boundary of the display device that is of a size sufficient to contain at least one unit of the information, wherein the designated object is a window, and wherein the at least one unit of the information comprises at least one application control;

moving the designated object to bring a portion of the designated object located outside the boundary of the display device onto the boundary of the display device in response to determining that the designated object does not have a portion within the boundary of the display device that is of a size sufficient to contain at least one unit of the information, by an amount such that the portion of the designated object has a size sufficient to contain one unit of the information and the portion is less than all of the designated object; and displaying the designated object containing the at least one unit of the information on the display device.

4. The system of claim 3, wherein said operation for determining whether an event has occurred comprises:

determining whether an event has occurred which causes at least a portion of the information to move outside a visible portion of the display device.

5. The system of claim 3, wherein the portion of the designated object that is moved onto the display device containing the at least one unit of the information contains at least one predetermined unit of the information.

6. The system of claim 5, wherein the at least one predetermined unit of the information includes a button.

7. The system of claim 3, wherein the object of said size sufficient to contain at least one unit of the information includes a tool palette.

8. A non-transitory computer-readable medium containing an executable program which, in response to execution by a processing device, causes the processing device to perform operations for maintaining information at an accessible position in a graphical user interface for a display device, the operations comprising:

determining whether an event has occurred that could affect the accessibility of the information;

identifying, based on preference information designating objects a user desires to keep visible on the display device, a designated object currently being displayed as an object which a user desires to keep on-screen on the display device;

determining whether the designated object has an on-screen portion within the area of the display device that is of a size sufficient to contain at least one unit of the information, wherein the designated object is a window, and wherein the at least one unit of the information comprises at least one window control;

in response to determining that the designated object does not have an on-screen portion within the area of the display device that is of a size sufficient to contain at least one unit of the information, moving the designated object to bring a portion of the designated object located outside the area of the display device onto the on-screen area of the display device, by an amount such that the on-screen portion of the designated object has a size sufficient to contain one unit of the information and the on-screen portion is less than all of the designated object; and displaying the designated object containing the at least one unit of the information on the display device.

9. The non-transitory computer-readable medium of claim 8, wherein the determining that an event has occurred comprises:

determining that an event has occurred which causes at least a portion of the information to move outside a visible portion of the display device.

10. The non-transitory computer-readable medium of claim 8, wherein the portion of the designated object that is moved onto the display device containing the at least one unit of the information contains at least one predetermined unit of the information.

11. The non-transitory computer-readable medium of claim 8, wherein said designated object is a utility window including one or more buttons, and said minimum amount of information comprises at least one button.

12. The non-transitory computer-readable medium of claim 8, wherein the designated object of said size sufficient to contain at least one unit of the information includes a tool palette.

13. The non-transitory computer-readable medium of claim 8, wherein the determining that an event has occurred comprises determining that an event has occurred which causes a change in a resolution of the display device.

14. The non-transitory computer-readable medium of claim 8, wherein the determining that an event has occurred comprises determining that an event has occurred which causes a change in the effective display area of the display device.

* * * * *